United States Patent
Chen

(10) Patent No.: US 12,217,262 B2
(45) Date of Patent: Feb. 4, 2025

(54) TIME BASED RISK MANAGEMENT MECHANISMS

(71) Applicant: Visa International Service Association, San Francisco, CA (US)

(72) Inventor: Yuexi Chen, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/299,468

(22) PCT Filed: Dec. 3, 2018

(86) PCT No.: PCT/US2018/063572
§ 371 (c)(1),
(2) Date: Jun. 3, 2021

(87) PCT Pub. No.: WO2020/117186
PCT Pub. Date: Jun. 11, 2020

(65) Prior Publication Data
US 2022/0027917 A1    Jan. 27, 2022

(51) Int. Cl.
| G06Q 20/00 | (2012.01) |
| G06F 1/12 | (2006.01) |
| G06Q 20/34 | (2012.01) |
| G06Q 20/40 | (2012.01) |

(52) U.S. Cl.
CPC ........... G06Q 20/4016 (2013.01); G06F 1/12 (2013.01); G06Q 20/341 (2013.01)

(58) Field of Classification Search
USPC .......................................................... 705/44
See application file for complete search history.

(56) References Cited

U.S. PATENT DOCUMENTS

| 7,926,096 B2 | 4/2011 | Ali et al. |
| 8,820,637 B1 * | 9/2014 | Roskind .................. G06F 21/34 |
|  |  | 235/487 |

(Continued)

FOREIGN PATENT DOCUMENTS

| CN | 104753881 A | 7/2015 |  |
| CN | 107231380 A | 10/2017 |  |
| EP | 2980743 | 2/2016 |  |
| WO | WO-2008050512 A1 * | 5/2008 | ........... G06F 21/575 |
| WO | 2017205018 | 11/2017 |  |

OTHER PUBLICATIONS

Authors: Zheng Chunying et al: Title: Risk management based on data warehouse of securities companies: Publisher: IEEE Xplore; Publication Date: Jul. 1, 2009 (Year: 2009).*

(Continued)

*Primary Examiner* — Bruce I Ebersman
*Assistant Examiner* — Hatem M Ali
(74) *Attorney, Agent, or Firm* — Kilpatrick Townsend & Stockton LLP

(57) ABSTRACT

Techniques for identifying a fraudulent interaction of a user device using time based risk features are described herein. In embodiments, time stamp information provided by an external clock and time units may be maintained by a user device. The user device may include an authentication component that is communicatively coupled to a clock component that generates the time units. In response to conducting an interaction with an access device and user device first time information may be received from the access device. Second time information may be determined based at least in part on the time units from the clock component and the time stamp information. The second time information may be compared to the first time information. An authentication plan for the interaction may be determined based at least in part on the comparison of the second time information to the first time information.

9 Claims, 4 Drawing Sheets

(56) References Cited

U.S. PATENT DOCUMENTS

| | | | | |
|---|---|---|---|---|
| 2008/0271117 | A1* | 10/2008 | Hamilton | H04L 63/08 726/3 |
| 2009/0271853 | A1* | 10/2009 | Everhart | G06Q 20/388 726/6 |
| 2012/0253745 | A1* | 10/2012 | Dhanapal | G06F 11/3419 702/186 |
| 2015/0150116 | A1 | 5/2015 | Baldwin et al. | |
| 2015/0161610 | A1 | 6/2015 | Sahadevan et al. | |
| 2018/0006821 | A1 | 1/2018 | Kinagi | |

OTHER PUBLICATIONS

Authors: Sergio Guerreiro et al: Title: Optimizing Business Processes Compliance Using an Evolvable Risk-Based Approach: IEEE Xplor: Publication Date: Jan. 1, 2016 (Year: 2016).*

1. Authors: Zheng Chunying et al: Title: Risk management based on data warehouse of securities companies: Publisher: IEEE Xplore; Publication Date: Jul. 1, 2009 (Year: 2009) (Year: 2009).*

2. Authors: Sergio Guerreiro et al: Title: Optimizing Business Processes Compliance Using an Evolvable Risk-Based Approach: IEEE Xplor: Publication Date: Jan. 1, 2016 (Year: 2016) (Year: 2016).*

Application No. EP18942493.0, Extended European Search Report, Mailed On Oct. 25, 2021, 7 pages.

"Gemalto Dynamic Code Card", Gemalto, Available Online at: https://www.gemalto.com/financial/cards/payments/dynamic-code-verification, Accessed from Internet on Jul. 20, 2018, 4 pages.

Application No. PCT/US2018/063572, International Search Report and Written Opinion, Mailed On Aug. 26, 2019, 9 pages.

Application No. CN201880099933.7, Office Action, Mailed On Jul. 21, 2023, 16 pages.

Application No. SG11202105844T, Notice of Decision to Grant, Mailed On May 14, 2024, 4 pages.

* cited by examiner

TIME BASED RISK MANAGEMENT MECHANISMS

CROSS-REFERENCE TO RELATED APPLICATIONS

None.

BACKGROUND

As users increasingly interact with resource providers using portable computing devices (e.g., desktop computers, laptop computers, tablet computers, mobile phones, gaming devices, etc.,) over networks, including the internet, the risks to the resource providers have increased that an interaction may be a fraudulent interaction. It may be difficult for resource providers to discern which interactions legitimate users are conducting and which interactions individuals attempting to conduct fraudulent activity are conducting. Conventional risk management techniques may utilize event based counters such as how many offline interactions have occurred with a given user device, or accumulators that determined an accumulated offline transaction amount. These counters or accumulators may be utilized to determine whether to approve or decline a transaction. However, such use of counters and accumulators may fail to meet requirements of regulations requiring that interactions or transactions be sent to processor computers after a certain amount of time has passed. Moreover, conventional card or user device architectures lack a reliable external time source which can be leveraged to meet such time regulations for authenticating interactions or transactions. Thus, enhanced methods of time based risk management techniques are needed which can reliability detect or prevent fraudulent transactions or interactions given certain time based requirements or regulations.

Embodiments of the disclosure address these and other problems, individually and collectively.

SUMMARY

Systems and techniques for authenticating a transaction or interaction of a user that uses time based risk analysis are described herein. A user device or payment chip card architecture may be modified to communicatively couple a clock chip (clock component) and EMV chip (authentication component) within the user device or payment chip card. The modified user device (e.g., payment card) may be powered via an internal battery component or capacitor that is configured to storage a charge and provide a current to the clock component. In embodiments, the internal battery component (capacitor) may be configured to recharge upon the user using the user device to interact with an access device during a transaction. The clock component may be configured to generate time units during manufacture and upon the internal battery providing power to the clock component, for example by counting up in time units as time passes. In embodiments, the authentication component may be configured with time stamp information during manufacture or personalization to a user via a trusted external clock. For example, the time stamp information may be provided by a processor computer associated with manufacture of the modified user device (e.g., payment card). Upon receiving the time stamp information the authentication component may communicate with the clock component to save a time unit number as an initial time unit metric. The modified user device (e.g., payment card) could receive and maintain one or more time limit policies from an authorizing computer that indicate an authentication plan to utilize based on various time difference scenarios. For example, one time limit policy may indicate a maximum time period that the modified user device (e.g., payment card) may be offline or not utilized in a transaction before user authentication is required. In embodiments, when the user device is utilized in a transaction or interaction an access device may provide time information which can be compared to the time information as determined by the authentication component. The difference between the time information received from the access device and the time information generated by the authentication component using the time units generated by the clock component and the time stamp information may be used to approve the transaction, decline the transaction, or require further authentication.

One embodiment of the disclosure is directed to a computer-implemented method performed by a user device comprising maintaining, by the user device, time stamp information provided by an external clock and time units, where the user device comprises an authentication component communicatively coupled to a clock component that generates the time units, receiving, by the user device, first time information from an access device in response to conducting an interaction with the access device and user device, determining, by the user device, second time information based at least in part on the time units from the clock component and the time stamp information, comparing, by the user device, the second time information to the first time information from the access device, and determining, by the user device, an authentication plan for the interaction based at least in part on the comparison of the second time information to the first time information.

In some embodiments, the computer-implemented method may further comprise maintaining, by the user device, one or more time limit policies that are associated with potentially fraudulent interactions, where the one or more time limit policies are specified by an authorizing computer, and where a time limit policy of the one or more time limit policies includes identifying a time period between interactions for the user device. In embodiments, the authentication plan includes requesting authentication of a user associated with the user device via the authorizing computer. In embodiments, a time limit policy of the one or more time limit policies includes identifying a time period corresponding to a user verification of a user associated with the user device.

In embodiments, the authentication plan includes requesting authentication information of the user associated with the user device via the access device. In embodiments, a time limit policy of the one or more time limit policies includes identifying a time period between the second time information and the first time information from the access device. In embodiments, the authentication plan includes declining the interaction based at least in part on the time period between the second time information and the first time information from the access device exceeding a threshold. In embodiments, determining the second time information comprises converting a difference between a first set of the time units from the clock component that were generated during initialization of the user device and a second set of the time units from the clock component that corresponds to a time period associated with the interaction, and adding the second time information to the time stamp information of the user device. In some embodiments, the computer-implemented method may further comprise storing, on the user device, the authentication plan and the second time information for the interaction. In some embodiments, the computer-implemented method may further comprise storing, on the user device, the time units from the clock component and associating the time units with information about the interaction.

Another embodiment of the disclosure is directed to a user device comprising an authentication component, a clock component communicatively coupled to the authentication component, a processor, and a memory including instructions that, when executed with the processor, cause the user device to at least maintain time stamp information provided by an external clock and time units generated by the clock component, maintain one or more time limit policies that are associated with potentially fraudulent interactions, the one or more time limit policies specified by an authorizing computer, receive first time information from an access device in response to an interaction between the user device and the access device, determine second time information based at least in part on the time units from the clock component and the time stamp information, and determine an authentication plan for the interaction based at least in part on a comparison of the second time information to the first time information from the access device and the one or more time limit policies.

In some embodiments, the user device may further comprise a battery component that is communicatively coupled to the clock component and is configured to store a charge for providing a current to the clock component. In embodiments, the battery component is further configured to recharge in response to the user device interacting with the access device. In embodiments, a time limit policy of the one or more time limit policies identifies a time period that upon expiration of the time period requires communicating with the authorizing computer for updates to the user device. In embodiments, a time limit policy of the one or more time limit policies includes identifying a time period between interactions for the user device. In embodiments, the authentication plan includes requesting authentication of a user associated with the user device via the authorizing computer. In embodiments, a time limit policy of the one or more time limit policies includes identifying a time period corresponding to a user verification of a user associated with the user device. In embodiments, the authentication plan includes requesting authentication information of a user associated with the user device via the access device. In embodiments, the user device is in the form of a card. In embodiments, the user device does not have long range communication capabilities or a microphone.

These and other embodiments of the disclosure are described in further detail below.

DETAILED DESCRIPTION

Figure 1:
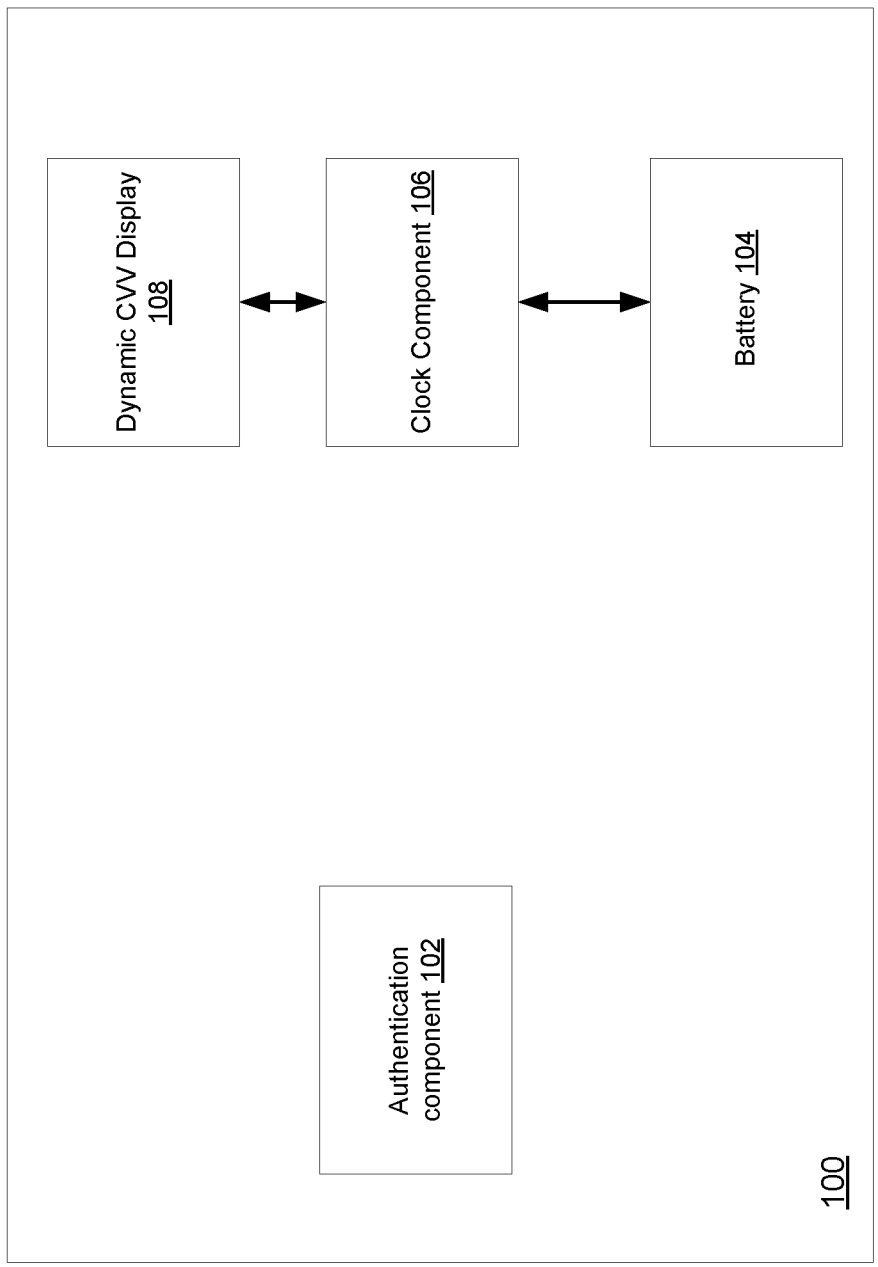
FIG. 1 depicts a conventional user device architecture that includes a dynamic card verification value (CVV) display.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present disclosure, description of some terms may be helpful in understanding the various embodiments.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale, and/or the like processor(s).

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

An "acquiring entity" can be an entity that can come into possession of something. An acquiring entity may be a business entity (e.g., a commercial bank) that has a business relationship with a particular resource provider, merchant, or other entity. An acquiring entity may operate an acquiring entity computer, which may be referred to as a "transport computer."

A "remote server computer" may include to a computer that is remotely located with respect to a client computer. In some embodiments, a remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity. In embodiments, the authorization computer may maintain a trusted clock for providing the time stamp information to user devices during manufacture or during personalization with a user.

An "authorization request message" may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

The term "authentication component" may include a software component or hardware component that can analyze data for performing authentication processes. In some embodiments, the authentication component may be integrated into a user device and configured for risk evaluation or risk determination for a transaction or interaction of the user device. In embodiments, the authentication component receives or obtain data such as time units from a clock component, time information from an access device, maintains time stamp information, and one or more time limit policies for determining an authentication plan for a given transaction or interaction. In embodiments, the authentication component may convert the time units from the clock component to time information which may be used to determine the authentication plan. In order to implement the authentication plan the authentication component may instruct communication with an access device or authorizing computer.

The term "interaction" may include an action conducted by a user or consumer. In embodiments, the user or consumer conducts interactions with a resource provider, such as a merchant website. In embodiments, the user conducts interactions with a resource provider via an access device. Typical interactions with a merchant system may include, but are not limited to, connecting to the merchant website, presenting authentication data to log into an account with the merchant website, modifying account settings on the merchant website, requesting authentication data, viewing products on the merchant website, and conducting a financial transaction. The interactions are typically conducted using a computing device (e.g., a desktop computer, laptop computer, tablet computer, internet-capable mobile phone, etc.) that is capable of connecting to the resource provider. Other interactions with a merchant system may include, but are not limited to, interacting with an access device of the merchant system with a user device to conduct a financial transaction.

The term "consumer" may refer to an individual or entity. The consumer may be associated with a financial account and with a user account with a resource provider. The consumer's financial account can be used to conduct financial transactions with the resource provider. In embodiments, the consumer conducts non-transaction related interactions with the resource provider. The consumer may be an individual attempting to conduct fraudulent activity by interacting with a resource provider using fraudulent or stolen authentication data. The term "user" may be used interchangeably with "consumer."

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

A "user device" may be any suitable device that is operated by a user. Suitable user devices can be portable and can communicate with external entities such as access devices. Examples of user devices include cards that have data stored on them, access cards, smart cards, etc. A payment device may be an example of a user device.

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. AN access device may be in any suitable form. Some examples of access devices include POS or point of sale devices (e.g., POS terminals), cellular phones, PDAs, personal computers (PCs), table PCs, hand-held specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.,) that control physical access to locations (e.g., venues, transit stations, homes, offices, buildings, etc.,) as well as software devices that control access to data or information. In embodiments, the access device may be configured to charge or recharge a user device via contact or contactless modes of operation.

The term "clock component" may include a software component or hardware component that can generate time units that do not correspond to a standard year, month, day, hour, minute, second format. A "time unit" may refer to a data metric that does not correspond to the standard time format described above. For example, the clock component may be configured to generate 25 time units per second. In embodiments, the "time stamp information" and "time information" may include a time that corresponds to a standardized format (e.g., year, month, day, hour, minute, second).

A "battery component" may be any suitable hardware container for storing a charge and providing a current to the clock component of the user device. In embodiments, the battery component may be configured recharge via an access devices during an interaction between the user device and access device via a contact or contactless mode of operation. A battery component may also include a capacitor.

A "time limit policy" may include a policy that identifies a time period associated with fraudulent or non-fraudulent transaction. In embodiments, a time limit policy may be specified by an authorizing computer. A time limit policy may specify a time period which when exceeded requires one action such as requesting additional user authentication before approving a transaction or when not exceed requires another action such as approving a transaction.

Embodiments of the invention provide for methods and systems that enhance conventional authentication processes by a user device that lacks long range communication capabilities or input/output devices such as microphones and speakers as well as reliable time source. Embodiments of the invention include a novel user device architecture that includes a clock component that generates time units and is communicatively coupled to the authentication component of the user device. Embodiments of the invention can use time stamp information and convert the obtained time units to generate an accurate or actual time that may be compared to any received time information (e.g., from an access device) for identifying potentially fraudulent transactions. In addition, by providing a reliable time source in a user device, one or more authorizing computer policies that utilize time period limitations to improve transaction security may be implemented. For example, by comparing a time generated by the authentication component of a user device, one or more time limit policies may be utilized to request further authentication of the user associated with the user device in some transaction scenarios while approving other transaction scenarios. Moreover, by including multiple sources for the battery component to recharge, the lifetime of a user device may be increased as conventional battery powered user devices may have a lifetime that is restricted to the initial charge carried by an associated battery. Conventional user devices may utilize internal chip computer processor units that communicate or otherwise utilize an external clock frequency to identify time information. However, communication with the external clock frequency may be unreliable.

FIG. 1 depicts a conventional user device architecture that includes a dynamic card verification value (CVV) display. FIG. 1 includes a conventional user device or payment card 100 that includes an authentication component (EMV) 102, a battery 104, a clock component 106, and a dynamic CVV display 108. In the conventional user device architecture of FIG. 1 the battery 104 may be configured to store a charge and provide a current to the clock component 106. The clock component 106 may be used to generate dynamic CVVs that are displayed via the dynamic CVV display 108. For example, the conventional user device 100 may be configured to generate a new CVV every twenty seconds. As the conventional user device 100 lacks any mechanisms for recharging the battery 104, the conventional user device 100 is only able to generate a limited number of dynamic CVVs before the battery loses the charge and the conventional user device or payment card 100 becomes unusable for conducting transactions. In addition, the conventional user device or payment card 100 lacks any processes for generating and maintaining a reliable time source. The clock component 106 may not be configured to communicate with the authentication component 102 and therefore cannot implement time based policies for identifying potentially fraudulent transactions using the conventional user device or payment card 100 because it lacks a method for generating a reliable time source and does not communicate with the authentication component 102.

Figure 2:
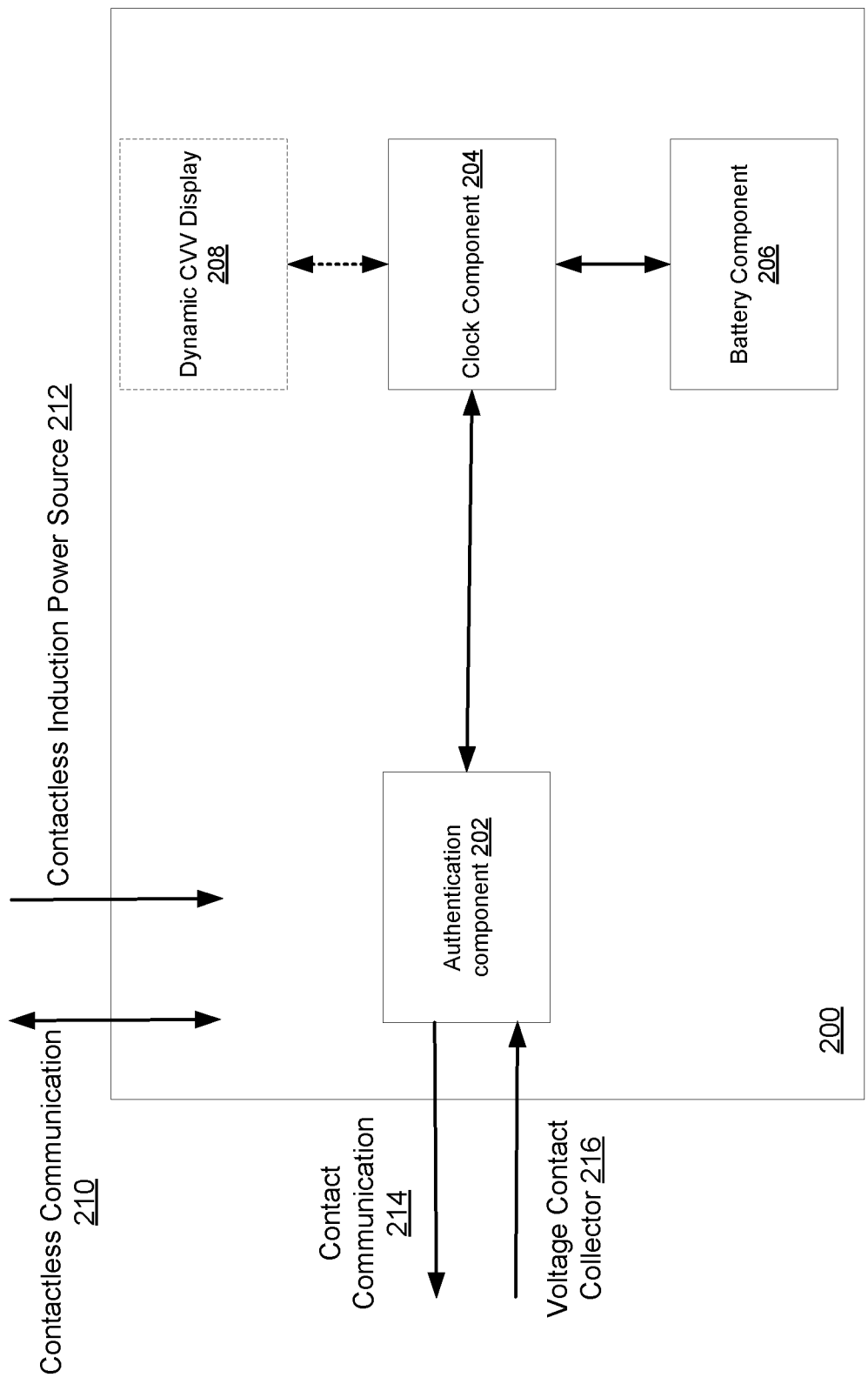
FIG. 2 depicts a number of components that may be involved in a system used to implement at least some embodiments of the disclosure.

FIG. 2 depicts a number of components that may be involved in a system used to implement at least some embodiments of the disclosure. FIG. 2 includes a modified user device (e.g., payment card) 200 that includes an authentication component 202 communicatively coupled to a clock component 204, and a battery component 206. The modified user device (e.g., payment card) 200 may optionally include the dynamic CVV display 208 for displaying dynamically generated CVVs using the time units generated by the clock component 204. The modified user device (e.g., payment card) 200 may include a contactless communication 210 and contactless induction power source 212 as well as a contact communication 214 and voltage contact collector 216 for recharging the battery component 206 upon interacting with an access device.

In accordance with at least one embodiment, the authentication component 202 may be configured to maintain time stamp information that corresponds to a standard date and time (e.g., year, month, day, hour, minute, second format). In embodiments, the time stamp information may be provided, imbedded, or otherwise communicated to the authentication component 202 during manufacture or personalization/initialization of the modified user device (e.g., payment card) 200. In embodiments, personalization/initialization of the modified user device (e.g., payment card) 200 may include a process whereby the modified user device (e.g., payment card) 200 is associated with a particular user or organization. For example, the time stamp information may correspond to a reliable time source provided by an external entity such as an authorizing computer. In embodiments, the time stamp information may correspond to t0. The battery component 206 may be any suitable container configured for storing a charge and providing a current to the clock component 204. In embodiments, the battery component 206 may be configured to recharge via the contactless communication port 210 and contactless induction power source 212 or via the contact communication port 214 and voltage contact collector 216 when the modified user device (e.g., payment card) 200 interacts with an access device. For example, when a user conducts a transaction and interacts with a payment terminal via the modified user device (e.g., payment card) 200, the battery component 206 may recharge. In embodiments, the contactless induction power source 212 may provide a charge to recharge the battery component 206 via any suitable contactless method including Bluetooth, near field communication, or other wireless battery recharging mechanisms.

In embodiments, the clock component 204 may be configured to generate time units upon receiving power or a current from the battery component 206. In accordance with at least one embodiment, the authentication component 202 may store and maintain the time stamp information (t0) as well as an initial time unit value (u0) generated by the clock component 204 that corresponds to the personalization/initialization process described herein. The authentication component 202 may be configured to convert the time units generated by the clock component 204 to a standard time format using a conversion ratio. For example, the conversion ratio in authentication component 202 may identify that 100 time units is equivalent to 20 seconds. During a transaction the authentication component 202 may obtain the current time units generated by the clock component 204 (u1) and determine the number of time units that have passed since the initialization of the modified user device (e.g., payment card) 200 by subtracting u1 from u0 (e.g., u1-u0). Each modified user device (e.g., payment card) 200 and authentication component may include a different conversion ratio and time unit generation pair. For example, one given clock component 204 may be configured to count up in time units by one unit at a time whereas another clock component may be configured to count up in time units by five units at a time. The authentication component 202 may be programmed or communicated with the appropriate conversion ratio for an associated clock component 204.

In accordance with at least one embodiment, the authentication component 202 may be configured to receive first time information from an access device that is interacted with by the modified user device (e.g., payment card) 200. The first time information may correspond to a standard time format. Conventionally, access devices are not as secure as other transaction elements such as issuer verification processes. For example, fraudsters can manipulate the time source of a given access device so that any time information that it provides to user devices during an interaction or transaction is different from the actual time, typically a previous time period. Resource providers or merchants associated with tampered access devices can submit transaction requests using the incorrect date to seek authorization for a transaction that was already conducted (e.g., submit the same transaction twice using different time information for the transaction). This can lead to authorizing entities automatically approving a transaction as the time period or date is of such a duration that if a contest was going to be made by the user it would have already been made. Moreover, merchants or resource providers may indicate that they no longer maintain receipts or records from transactions that occurred from a previous time period so that contesting such a transaction is difficult for a user even though the transaction actually did not occur that long ago but the tampered time source indicates that it did occur in a significant time period in the past.

In embodiments, upon receiving the first time information from the access device, the modified user device (e.g., payment card) 200 and authentication component 202 may generate second time information which corresponds to an actual time (e.g., a time period that corresponds to the time generated by the modified user device (e.g., payment card) 200 using the reliable time source of the clock component 204 and generated time units). The second time information may correspond to a standard date and time format for example. In embodiments, the authentication component 202 may generate the second time information by adding the time generated from subtracting u0 from u1, converting the remaining time units to a date and time format, and adding the date and time format from the time units to the time stamp information. The second time information may correspond to tA or actual time.

In embodiments, the modified user device (e.g., payment card) 200 and authentication component may be configured to store and update one or more time limit policies provided by an authorization computer. An example time limit policy may indicate or identify a time period, such as twenty days since the modified user device (e.g., payment card) 200 was last utilized to conduct a transaction. The example time limit policy may indicate that if the modified user device (e.g., payment card) 200 was not utilized to conduct a transaction in the last twenty days than authentication via an authentication computer or issuer is necessary before the transaction will be approved. For example, the one or more time limit policies may be communicated, implemented, or otherwise stored in the authentication component during the personalization/initialization process or during manufacture of the modified user device (e.g., payment card) 200. In accordance with at least one embodiment, the modified user device may receive updates to the one or more time limit policies via another device that has both short range communication capabilities (such as NFC or Bluetooth for interacting with the modified user device (e.g., payment card) 200) and long range communication capabilities (such as wireless internet capabilities).

The one or more time limit policies specified by the authorizing computer may each identify a time period and indicate an authentication plan that should be implemented by the modified user device (e.g., payment card) 200 and authentication component 202. For example, one time limit policy may indicate a time period between using the modified user device (e.g., payment card) 200 in which case an issuer authentication or user authentication must occur (e.g., 20 days between using the modified user device (e.g., payment card) 200 in a transaction indicates that authentication must occur before a current transaction is approved). Given the above example, the authentication component 202 compares the second time information with the first time information to determine a time period such as 31 days since the modified user device (e.g., payment card) 200 was last utilized to conduct a transaction. Using the above time limit policy the modified user device (e.g., payment card) 200 and authentication component 202 would require that the user perform some form of authentication or else the transaction would be declined as the time period determined by the modified user device (e.g., payment card) 200 and authentication component 202 (31 days) exceeds the time period of the time limit policy (20 days).

Another time limit policy may indicate a time period that when compared to the time period generated from comparing the second time information and the first time information requires that the user associated with the modified user device (e.g., payment card) 200 authenticate using an offline method such as providing a personal identification number (PIN) or biometric authentication via the access device or some other device. A time limit policy may indicate a time period that when compared to the time period generated from comparing the second time information to the first time information requires that the user associated with the modified user device (e.g., payment card) 200 perform an online authentication such as by performing an authentication with the authorizing computer associated with the modified user device (e.g., payment card) 200. If the time period that corresponds to the comparison of the second time information and the first time information does not violate one of the one or more time limit polices than the transaction may be approved (e.g., not require further authentication) and may proceed as normal. For example, the timestamp information may be Jan. 1, 2018 at 12:00 AM, and the time units may correspond to increments of 5 minutes. The received first time information from the access device may be Jan. 2, 2018 at 12:00 AM. The modified user device (e.g., payment card) 200 and the authentication component 202 may use the time stamp information and the conversion ratio to add the time units generated from u0, which may be 288 time units at 5 minute increments (u1), and adding the minutes to the time stamp information to determine the second time information (actual time information) as Jan. 2, 2018 at 12:00 AM. As described herein, the first time information and the second time information are compared to identify the difference between the times and apply the difference to the one or more time limit policies and determine an authentication plan. In the above described scenario as the first time information is the same as the time generated by the modified user device (e.g., payment card) 200 (second time information) the transaction may be approved according to a given time limit policy of the authentication component 202.

In embodiments, the authentication component 202 may be configured to store the data (e.g., first time information, second time information, time units, and decision made or authentication plan utilized) for each transaction or interaction with the modified user device (e.g., payment card) 200. In embodiments, the clock component 204 and authentication component 202 may be utilized to generate dynamic CVVs that are presented via the dynamic CVV display 208. For example, a seed or key stored in the authentication component 202 may be utilized with a given time unit value of the clock component 204 to dynamically generate different CVV values for use in authenticating or authorizing a transaction using the modified user device (e.g., payment card) 200. As indicated by the dashed lines in FIG. 2, the dynamic CVV display 208 may be optional in the modified user device (e.g., payment card) 200.

For clarity, a certain number of components are shown in FIG. 2. It is understood, however, that embodiments of the disclosure may include more than one of each component. In addition, some embodiments of the disclosure may include fewer than or greater than all of the components shown in FIG. 2. In addition, the components in FIG. 2 may communicate via any suitable communication medium using any suitable communication protocol.

Figure 3:
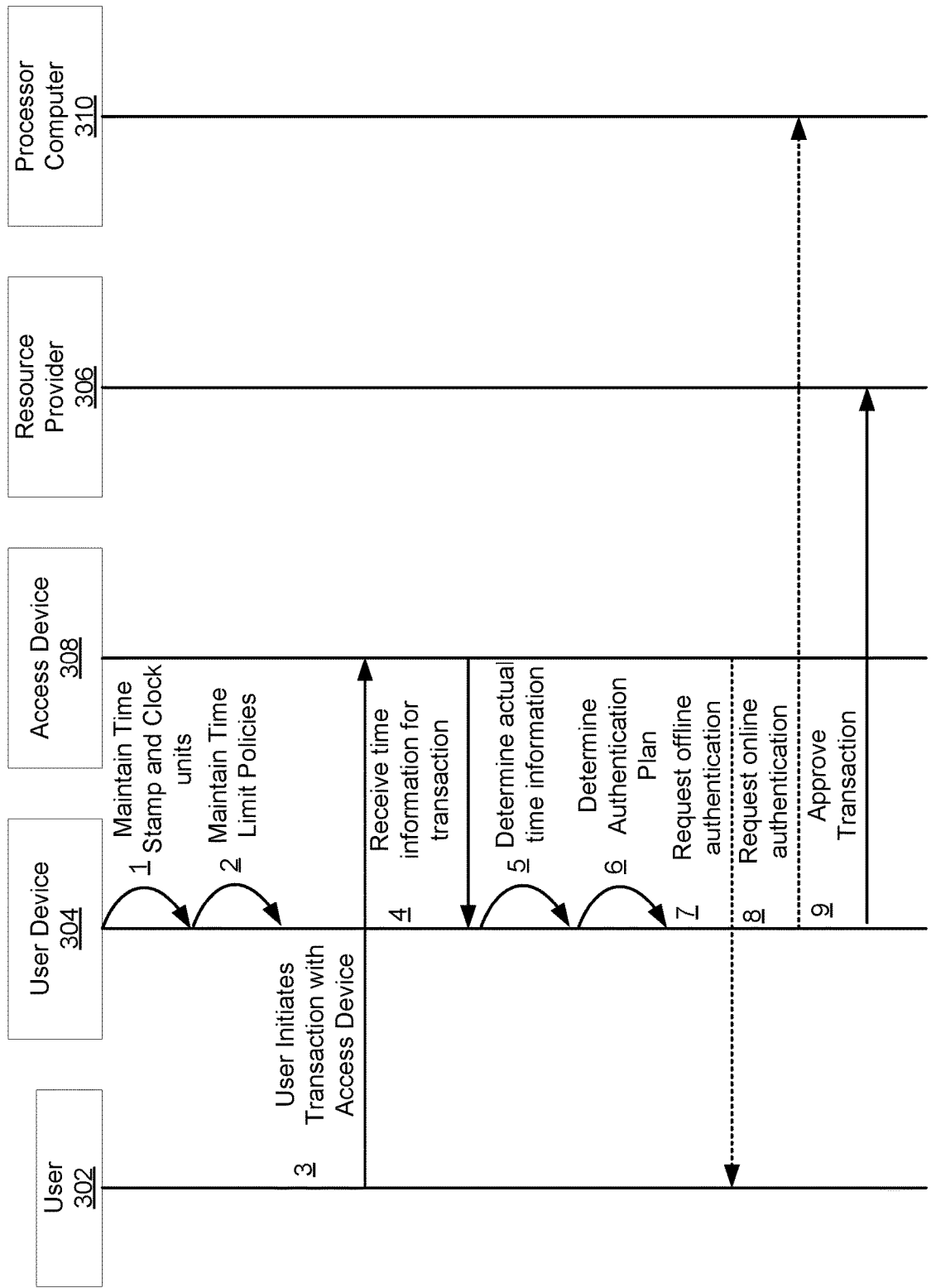
FIG. 3 depicts a flow diagram illustrating a method according to an embodiment of the invention.

FIG. 3 depicts a flow diagram illustrating a method according to an embodiment of the invention. FIG. 3 includes a user 302 utilizing a user device 304 to conduct a transaction or interaction with resource provider 306 via access device 308. FIG. 3 also includes a processor computer 310. In embodiments, the access device 308 may be in operative communication with the resource provider 306. The resource provider 306 and the access device 308 may be in operative communication with the processor computer 310. The user device 304 may be in operative communication with the resource provider 306.

The resource provider 306 may operate a merchant computer. The resource provider 306 in FIG. 3 may indicate the merchant computer. The merchant computer may include any suitable computational apparatus. Examples of a merchant computer may include an access device (access device 308) and/or an online merchant computer. In some embodiments, the merchant computer may include a web server computer that hosts one or more websites associated with the merchant. The merchant computer can be configured to send and receive data as part of a transaction verification and authentication process for a transaction using the user device 304, the access device 308, and the resource provider 306 (e.g., a transaction conducted between a user (user 302) and the merchant). The merchant computer may also be configured to generate or facilitate generation of authorization request messages and may route the authorization request messages, for example, to the processor computer 310.

The processor computer 310 may be a processing network computer which may be configured to provide authorization services, and clearing and settlement services for payment transactions. The processor computer 310 may operate on behalf of an authorizing computer. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. The processor computer 310 may also operate or integrate with an MPI (merchant plug in).

Before step 1, in FIG. 3, the user 302 may already be associated with user device 304 such that the user device 304 is personalized or initialized with time stamp information and the clock component is generating time units (e.g., the authentication component has stored and maintains t0 and u0). At step 1, the user device 304 maintains time stamp information and clock units generated by the clock component. At step 2, the user device 304 maintains one or more time limit policies. In embodiments, the processor computer 310 or an authorizing computer may have already communicated the one or more time limit policies for storage and maintenance to the user device 304. The one or more time limit policies may be communicated to and stored on the user device 304 at the personalization or initialization process with the user 302 or during manufacture of the user device 304. may use user device 304 to interact with access device 304.

At step 3, the user 302 may utilize user device 304 to conduct a transaction with resource provider 306 by interacting with access device 308 with the user device 304.

At step 4, the user device 304 may receive time information (first time information) for the transaction from the access device 308. The first time information may be provided in a standard date and time format described herein (e.g., 2018-11-21, 3:30:26 PM.

At step 5, the user device 304 determines the actual time information (second time information) for the transaction. As described herein, the authentication component may utilize the time units generated by the clock component and the time stamp information to determine the second time information. In accordance with at least one embodiment, the authentication component and user device 304 compare the first time information and the second time information to determine a time period (e.g., five days or 40 minutes) which can be compared to the one or more maintained time limit policies.

At step 6, the user device 304 determines an authentication plan based at least in part on the comparison of the first time information to the second time information and the one or more time limit policies. As described herein, if the comparison of the first time information and the second time information does not violate one of the one or more time limit policies than the transaction is approved (step 9). However, an authentication plan determined by the user device 304 may include requesting offline authentication (step 7) such as having the user provide a PIN or biometric via the access device 308 or some other associated user device. The authentication plan could also include requiring an online authentication (step 8) with the processor computer 310 prior to approving the transaction (step 9).

Figure 4:
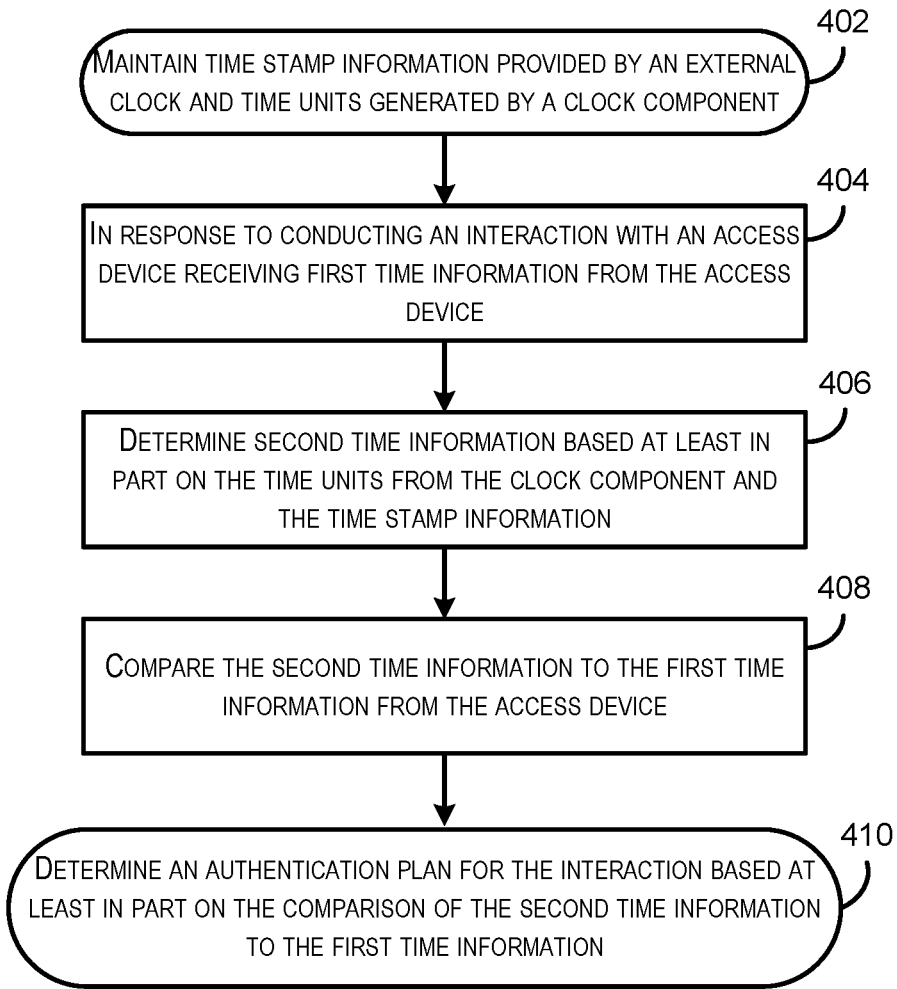
FIG. 4 depicts a flow diagram of a process for performing a time based risk management feature in accordance with at least some embodiments.

FIG. 4 depicts a flow diagram of a process for performing a time based risk management feature in accordance with at least some embodiments. FIG. 4 illustrates process 400 which can be performed by a modified user device (e.g., payment card) depicted in FIGS. 2 and 3.

Process 400 may begin at 402 by maintaining time stamp information provided by an external clock and time units generated by a clock component. The process 400 may include receiving first time information from an access device in response to conducting an interaction with the access device via the user device at 404. The process 400 may include determining second time information based at least in part on the time units from the clock component and the time stamp information at 406. The process 400 may include comparing the second time information to the first time information from the access device at 408. The process 400 may conclude at 410 by determining an authentication plan for the interaction based at least in part on the comparison of the second time information to the first time information.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

maintaining, by a smart card comprising an authentication component communicatively coupled to a clock component, time stamp information provided by an external clock and time units generated by the clock component, and not corresponding to a standard time format, wherein the smart card is free of a display, wherein the smart card comprises a battery component coupled to the clock component and configured to store a charge for providing a current to the clock component;

in response to conducting an interaction with an access device, receiving, by the smart card, first time information from the access device;

converting, by the smart card and via the authentication component, the time units from the clock component to a standard time format using a conversion ratio unique to the smart card;

determining, by the smart card, second time information based at least in part on the converted time units from the clock component and the time stamp information, wherein determining the second time information comprises:

calculating a difference between a first set of the time units from the clock component that were generated during initialization of the smart card and a second set of the time units from the clock component that corresponds to a time period associated with the interaction, converting the difference to the standard time format, and adding the second time information to the time stamp information of the smart card to obtain the second time information;

comparing, by the smart card, the second time information to the first-time information from the access device;

maintaining, by the smart card, one or more time limit policies that are associated with potentially fraudulent interactions, the one or more time limit policies specified by an authorizing computer, the one or more time limit policies including identifying a first time period between interactions for the smart card; and identifying a second time period corresponding to a user verification of a user associated with the smart card, the interactions including presenting, by the smart card, authentication data to log into an account with a merchant website;

determining, by the authentication component of the smart card, an authentication plan for the interaction based at least in part on: (1) the comparison of the second time information to the first time information, and (2) the one or more time limit policies; and implementing, by the authentication component of the smart card, the authentication plan by instructing communication with the access device when the authentication plan requires user authentication, or communication with the authorizing computer when the authentication plan requires including requesting authentication of the user associated with the smart card via the authorizing computer, and declining the interaction based at least in part on a third time period between the second time information and the first time information from the access device exceeding a threshold.

2. The method of claim 1, wherein the authentication plan includes requesting authentication information of the user associated with the smart card via the access device.

3. The method of claim 1, further comprising storing, on the smart card, the authentication plan and the second time information for the interaction.

4. The method of claim 1, further comprising storing, on the smart card, the time units from the clock component and associating the time units with information about the interaction.

5. A smart card comprising:

an authentication chip;

a clock chip communicatively coupled to the authentication chip;

a battery that is coupled to the clock chip and is configured to store a charge and provide a current to the clock chip;

a processor; and a memory including instructions that, when executed with the processor, cause the smart card to, at least:

maintain time stamp information provided by an external clock and time units generated by the clock chip, wherein the time units generated by the clock chip are in a non-standard time format, wherein the smart card is free of a display;

maintain one or more time limit policies that are associated with potentially fraudulent interactions, the one or more time limit policies specified by an authorizing computer, the one or more time limit policies including identifying a first time period between interactions for the smart card, and identifying a second time period corresponding to a user verification of a user associated with the smart card, the interactions including presenting, by the smart card, authentication data to log into an account with a merchant website;

receive first time information from an access device in response to an interaction between the smart card and the access device;

convert, via the authentication chip, the time units generated by the clock chip in the non-standard time format to a standard time format using a conversion ratio unique to the smart card;

determine second time information based at least in part on the converted time units from the clock chip and the time stamp information, wherein determining the second time information comprises:

calculating a difference between a first set of the time units from the clock chip that were generated during initialization of the smart card and a second set of the time units from the clock chip that corresponds to a time period associated with the interaction, converting the difference to the standard time format, and adding the second time information to the time stamp information of the smart card to obtain the second time information;

determine an authentication plan for the interaction based at least in part on: (1) a comparison of the second time information to the first time information from the access device, and (2) the one or more time limit policies; and implement, by the authentication chip, the authentication plan by instructing communication with the access device when the authentication plan requires user authentication, or communication with the authorizing computer when the authentication plan requires authentication of the user associated with the smart card via the authorizing computer thereby eliminating a digital display on the smart card, and declining the interaction based at least in part on a third time period between the second time information and the first time information from the access device exceeding a threshold.

6. The smart card of claim 5, wherein the battery is further configured to recharge in response to the smart card interacting with the access device.

7. The smart card of claim 5, wherein a time limit policy of the one or more time limit policies identifies a time period that upon expiration of the time period requires communicating with the authorizing computer for updates to the user device.

8. The smart card of claim 5, wherein the authentication plan includes requesting authentication information of the user associated with the smart card via the access device.

9. The smart card of claim 5, wherein the smart card does not have long range communication capabilities or a microphone.

* * * * *